United States Patent Office 3,531,376
Patented Sept. 29, 1970

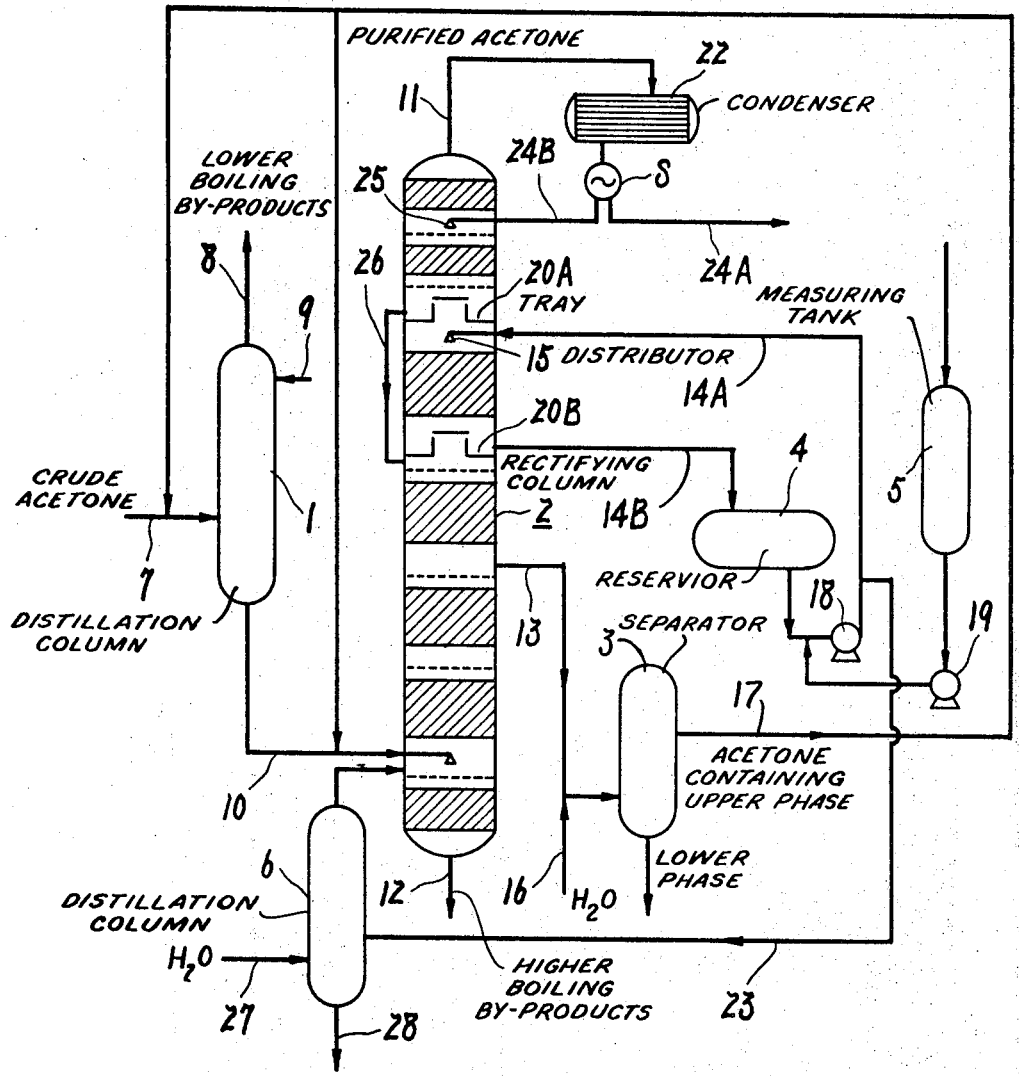
MINODA, SHIMIZU, MATSUMOTO + MAEDA
INVENTORS

3,531,376
PURIFICATION OF ACETONE BY EXTRACTIVE DISTILLATION AND RECTIFICATION WITH SIMULTANEOUS ALKALI-CONTAINING ACETONE SOLUTION CONTACT AND HALOGEN IMPURITY SIDE STREAM REMOVAL
Shigehiko Minoda, Tokuzo Shimizu, Takeyoshi Matsumoto, and Toshihiro Maeda, Kurashiki-shi, Japan, assignors to Mitsubishi Chemical Industries Limited, a corporation of Japan
Continuation-in-part of application Ser. No. 659,681, Aug. 10, 1967. This application Dec. 23, 1968, Ser. No. 797,309
Int. Cl. B01d 3/34; C07c 45/24
U.S. Cl. 203—33
14 Claims

ABSTRACT OF THE DISCLOSURE

A process for the purification of acetone. Acetone manufactured by the Wacker process is subjected to a water extractive distillation, then rectified. An acetone solution or suspension containing alkali metal carbonate or hydroxide is contacted, in the upper portion of a rectifying column, with a countercurrent of acetone vapor ascending through said column.

---

This application is a continuation-in-part of co-pending application Ser. No. 659,681, filed Aug. 10, 1967, now abandoned.

This invention relates to a process for the purification of acetone. More particularly, it relates to a process for the purification of acetone produced by the so-called Wacker process. The Wacker process comprises contacting propylene with a catalyst containing a salt of a platinum group metal such as palladium chloride and a heavy metal halide such as cupric chloride, which may take at least two valence stages.

The distillation of an aqueous crude acetone solution, which has been previously treated to remove lower-boiling by-products, is conventional in the prior art. However, it is difficult to completely remove those impurities or by-products having boiling points approximating that of acetone. In the Wacker process, propylene is brought into contact with a catalyst containing palladium chloride and cupric chloride. The acetone produced thereby is purified by a process which comprises adding water and distilling to remove lower-boiling-point by-products, then rectifying the product of the water extractive distillation. However, crude acetone produced by the water extractive distillation still contains chlorine-containing by-products as, for example, chloroacetone. In the rectification step, a portion of these chlorine-containing by-products is removed through the bottom of the rectifying column. However, the rest of said chlorine-containing by-products condenses and tends to accumulate in the rectifying column. This deteriorates the quality of the acetone, and also causes corrosion of the column.

The problem may be resolved by discarding said impurities from the column. However, this results in a substantial loss of acetone. A number of processes have been proposed which endeavor to avoid said acetone loss. One such process comprises withdrawing a mixture of acetone and by-products from the rectifying column and recovering the acetone from said mixture. Another process comprises subjecting said mixture to chemical washing to remove those by-products that could not be separated from the crude acetone in the distillation step. For example, German Pat. No. 1,191,798 discloses a process for the rectification of a crude acetone obtained by oxidizing olefin in the presence of a water-soluble catalyst. The catalyst contains platinum group metal salts and heavy metal halides which may take at least two valence stages. In said German process acetone vapor ascending through a rectification column is brought into contact within the upper part of the column with an aqueous alkaline solution so as to remove a small amount of the impurities contained in said acetone vapor. The purified acetone thereby obtained is drawn off the top of the column while higher-boiling-point impurities are discarded from the bottom of the column.

The German patent also describes an acetone purification process in which chloroacetones accumulating within the rectifying column are withdrawn along with acetone through the mid part of the column and introduced into a distilling column. The acetone distilled off the top of said distilling column is recovered and recycled to the rectifying column.

We have found that when a concentrated aqueous alkaline solution, as, for example, an aqueous 20–40% caustic soda solution, is fed into a rectifying column and contacted with acetone vapor, as described in said German patent, the acetone is caused to condense per se by the catalytic action of the alkaline solution. As a result of said condensation the yield of acetone is reduced by a factor of 5 to 15 percent. Moreover, though use of a dilute aqueous alkaline solution affords a better acetone yield, the acetone distilled off the top of the column may contain an appreciable amount of water.

We have now discovered that if acetone vapor is washed as it ascends through a distilling column, with an alkali-containing acetone solution, in which an alkali or alkalies are dissolved or partly suspended, the resultant yield of acetone is more than 99.0 percent. Although substantially no self-condensation of acetone occurs, we have found that impurities, especially reducing substances, are converted to higher-boiling substances, so that the acetone taken off the top of the column contains no reducing substances and has an excellent permanganate test time.

Accordingly, it is the object of this invention to provide an improved process for the purification of acetone which gives acetone of a higher purity and at a higher yield.

Other objects and advantages of the invention will be apparent as the disclosure progresses.

In accordance with the invention, there is proposed a process for the purificaation of acetone which comprises contacting propylene with a catalyst, which contains a salt of the platinum metal group and a heavy metal halide, which may take at least two valence stages whereby a crude acetone is obtained; subjecting the resulting crude acetone to a treatment to remove therefrom low-boiling by-products; introducing the treated acetone into a rectifying column and distilling purified acetone off the top of the column while discharging higher-boiling by-products from the bottom thereof; characterized in that an alkali-containing acetone solution in which an alkali or alkalies are either dissolved or partly suspended is introduced into the rectifying column via the upper portion thereof so that said solution comes into contact with a countercurrent of crude acetone vapor ascending through the column.

The invention will now be described in more detail.

Examples of alkalies to be employed in accordance with the invention include alkali metal hydroxides such as sodium hydroxide and potassium hydroxide, and alkali metal carbonates such as sodium carbonate and potassium carbonate. These alkalies may be employed individually or in combination. As a matter of fact, when sodium hydroxide is added to an alkali-containing acetone solution, it absorbs the carbon dioxide usually present in the crude acetone vapor in the rectifying column and is thereby converted in part to sodium carbonate.

In accordance with the invention, commercial acetones may be employed as solvent for said alkalies. Normally, these acetones contain from 0.3 to 1 percent moisture. Although this moisture content range is acceptable, a range of 0.2 to 2 percent is preferred. The 0.2 to 2 percent range is preferred because the moisture content of the acetone which is recycled for repetition of the alkali treatment can be invarialby held in said range. Moreover, though this amount of moisture does not adversely affect the content of water in the acetone distilled off the top of the column it is still sufficient to maintain a suitable alkalinity of the alkali-containing acetone solution.

The preferred concentration of alkali is 1 to 15 p.p.m., preferably 2 to 5 p.p.m. for alkali metal hydroxides.

In this connection, it should be noted that too high a concentration of alkali metal hydroxide in said solution tends to cause the self-condensation of acetone which in turn lowers the yield of purified acetone; while too low a concentration gives unsatisfactory results in the crude acetone vapor wash.

Alkali metal carbonates may be employed in concentrations higher than said alkali metal hydroxides because a high concentration of alkali metal carbonate does not have as strong a tendency to cause acetone self-condensation as does alkali metal hydroxide. Therefore a suspension of a higher concentration of said carbonates may be employed so long as no clogging occurs in the circulation system. The preferred concentration of alkali metal carbonates is 1 to 3000 p.p.m.

Alkali metal hydroxide and alkali metal carbonate may be employed at the same time, provided that the concentration of each in the solution falls within its above-mentioned range. However, the minimum in this case shifts to 1 p.p.m. in total.

The alkali-containing solution is sprayed into the concentration zone of a rectifying column through an opening located far down from the top of said zone to within about one-third depth or vertical length thereof so as to contact with and wash a countercurrent of crude acetone vapor ascending through the column from the lower part thereof. The alkali-containing solution is then collected on a tray, withdrawn from the column, and recycled into the system. When withdrawn from the column, alkalies in the washing solution are found to have been consumed by organic chlorides contained in the crude acetone vapor. In such cases it is advisable to adjust the alkali concentration of the washing solution by intermittently adding an alkali to the solution. As a result of such alkali addition, inorganic salts tend to accumulate gradually in the washing solution.

Although, as previously mentioned, a higher content of carbonates may be used as long as no clogging occurs, the total solids content should be held below 1–2%. This is so because accumulation of inorganic salts, including chlorine, tends to cause corrosion of the apparatus. For this reason, it is desirable to withdraw a portion of the solution being recycled and to treat it so as to remove inorganic salts therefrom.

The alkali treatment is performed at the upper portion of a rectifying column. In accordance with the invention (1) a side stream may be withdrawn from the midpart of the column and discarded as waste. The side stream contains chlorinated impurities which accumulate in the column; (2) advantageously, said withdrawn side stream is subsequently subjected to a suitable treatment to recover acetone therefrom.

Even though the side stream to be discarded of process (1) may be reduced by regulating various factors relevant to the acetone formation reaction or the crude acetone purification, the loss of acetone is unavoidable. Consequently, the latter process (2), in which the side stream is subjected to a treatment to remove chlorinated impurities and the remaining liquid is then recycled, is preferred. Further, it is most advantageous to subject the side stream to the water extractive treatment which will be described herein.

The normal composition of a side stream withdrawn from a zone located in the mid-part of a rectifying column, where the concentration of chlorination products is highest, is shown in the following Table 1:

TABLE 1

| Ingredient: | Content, wt. percent |
|---|---|
| Acetone | 3–30 |
| Water | 10–60 |
| Chloropropionaldehydes | 10–30 |
| Chloroacetones | 10–35 |
| Balance | 0–5 |

To the side stream is added, according to the above-mentioned process, an amount of water which is usually 0.25 to 3.0 times, preferably 1 to 2 times the amount of said stream. The mixture is stirred at a temperature of 5° to 60° C., preferably 20° to 40° C. in order to divide the mixture into an upper aqueous phase and a lower oily phase. The major portion of the acetone contained in the side stream is extracted into the upper aqueous phase and recycled to the rectifying column or to the crude acetone purification step which precedes the rectification. The lower oily phase comprised chiefly of chlorinated by-products is removed from the system.

The side stream recovery distillation process of said German patent is compared with the above-mentioned water extractive process in the following Table 2. Table 2 shows that the amount of chlorinated by-products, especially chloropropionaldehydes, which are transferred to the recycled crude acetone recovered by the treatment of the side stream is reduced by our process. This means the decreased accumulation of chlorinated by-products which deteriorate the quality of acetone and cause corrosion and clogging of the apparatus.

TABLE 2

| | German patent [1] in percent [3] | Our invention [2] in percent |
|---|---|---|
| Ingredient: | | |
| Acetone | 83 | 83 |
| Chloropropionaldehydes | 95 | 65 |
| Chloroacetones | 68 | 51 |
| Rest | 60 | 62 |

[1] Side stream recovery distillation.
[2] Water extractive treatment.
[3] Computed on the basis of 100% of each of ingredients contained in the side stream.

According to the process of our invention, in contrast with the conventional process in which aqueous alkaline solution is employed, both the substantial decrease in the yield of acetone and the appreciable increase in the moisture content of acetone distilled off the top of the column are avoided. In addition, the acetone obtained by the process of this invention contains substantially no by-products, especially those of reducing nature, and has a satisfactory permanganate test time. Further, the combination of our alkali treatment and water extractive treatment ensures the production of acetone of a high purity and at high yield without apparatus corrosion or clogging.

A mode in which the invention is worked will be illustrated by reference to the attached drawing.

A crude acetone which has been freed of catalyst is fed to the preliminary distilling column 1 via the conduit 7. Water is concurrently introduced into the column via the conduit 9 for the water extractive distillation of the crude acetone during which lower-boiling point by-products contained in the reaction product are driven out of the system via the conduit 8. The remaining liquid is introduced into the rectifying column 2 via the conduit 10 for rectification. The resulting purified acetone vapor is introduced into the condenser 22 via the conduit 11 for condensation. A portion of the condensed acetone is removed from the system as product acetone by means of a shunt indicated at S through the conduit 24A; and the rest is refluxed to the rectifying column through the conduit 24B and the distributor 25, collected on the tray 20A and then transferred via the conduit 26 to a portion of the column lower than the tray 20B. Higher-boiling-point by-products are discarded from the system through the outlet opening 12. In the meantime a side stream is withdrawn from the mid-part of the rectifying column and passed through the conduit 13 for thorough mixing therein with water which is fed in through the conduit 16. The resulting admixture is introduced into the separator 3 and is divided therein into upper and lower liquid phases. The lower oily phase is removed through the bottom of the separator and is discarded from the system. The acetone containing upper phase is withdrawn from the separator via the conduit 17 and is recycled to an appropriate spot of the crude acetone purification system.

An alkali-containing acetone solution, for washing the acetone vapor, is fed to the rectifying column 2 from the reservoir 4 by means of the pump 18 for circulation. The moisture content of this acetone solution is normally from 1 to 2% but varies more or less depending on the operation conditions of the rectifying column and the location of the distributor 15 of the column. A saturated aqueous solution of alkali metal hydroxide or carbonate is suitably supplied to the circulating alkali-containing acetone solution from the measuring tank 5 by means of the pump 19 in order to adjust the concentration of the acetone solution to a fixed value. The alkali-containing acetone solution is introduced into the rectifying column 2 via the conduit 14A, and is distributed into the column in divided form by distributor 15. The alkali-containing acetone solution is contacted with a countercurrent of acetone vapor ascending through the column, collected on the tray 20B, and withdrawn therefrom via the conduit 14B for further circulation to the reservoir 4. It will be noted that the above-mentioned alkali-containing acetone solution is fed to the concentration zone of the rectifying column at a location part way down from the top of said zone to within approximately one-third depth of the zone. In order to prevent accumulation of solids in the circulation system, a portion of the liquid is intermittently withdrawn and introduced into distilling column 6. An approximately equivalent amount of water is added thereto via the conduit 27 and the mixture is distilled. The acetone which is recovered at the top of the column is introduced into the rectifying column. Inorganic salts are discharged from the bottom of the column in the form of an aqueous solution.

Some examples of the invention will now be described, but only for the purpose of illustrating the invention and not for the purpose of limiting the same.

EXAMPLE 1

A catalyst solution containing palladium chloride, cupric chloride and hydrochloric acid was contacted with propylene gas. After the reaction the catalyst solution was removed. A quantity of water was added to the resulting reaction product and the mixture was distilled to drive off lower-boiling-point-by-products such as propionaldehyde.

The resulting aqueous crude acetone solution contained 9.21% of acetone. This crude acetone solution was fed to a rectifying column at the rate 20.0 kg./hr. for distillation. During the distillation higher-boiling-point by-products were removed from the bottom of the column; a side stream was withdrawn, at the rate of 0.11 kg./hr., from the mid part of the column in which chloropropionaldehyde, chloroacetone and the like were accumulating; and concurrently purified acetone was distilled off the top of the column. In the meantime, an alkali-containing acetone solution containing 0.1% sodium carbonate and 1 p.p.m. sodium hydroxide was poured into the column to wash the acetone vapor. The solution was introduced in a divided form and at the rate of 4 kg./hr. The alkali-containing acetone solution was introduced into the column via an opening located far down from the top of the concentration zone of the column by one-third depth of said zone.

The acetone thus obtained from the top of the column, the acetone obtained by the same process excepting that an aqueous 30% sodium hydroxide solution was substituted for the above-mentioned alkali-containing acetone solution, and the acetone obtained without employing any washing agent, are compared as to yield and quality in the following Table 3.

TABLE 3

|  | Washing agent | | |
| --- | --- | --- | --- |
|  | No washing | Aqueous 30% NaOH solution | 1 p.p.m. NaOH plus 0.1% $Na_2CO_3$-containing acetone suspended solution |
| Averaged yield of acetone, kg./hr. | 1.82 | 1.73 | 1.81 |
| Purification yield, percent | 98.7 | 93.8 | 98.3 |
| Permanganate test time [1], hr | 0.5–1.0 | [2] | [2] |
| Specific gravity, $d\frac{20}{20}$ | 0.791 | 0.791 | 0.791 |
| Moisture content, wt. percent | 0.22 | 0.25 | 0.22 |
| Litmus test | [3] | [3] | [3] |
| Acidity [4], percent | 0.0010 | 0.0008 | 0.0009 |
| Vaporization residue, percent | 0.0002 | 0.0002 | 0.0002 |

[1] ASTM-test D-1363.
[2] More than.
[3] Neutral.
[4] Value of acetic acid which was computed on the basis of acid content of acetone.

EXAMPLE 2

A catalyst solution containing palladium chloride, cupric chloride, and hydrochloric acid was contacted with propylene gas and the catalyst solution was then removed. The resulting reaction product was added to a quantity of water and lower-boiling-point by-products such as propionaldehydes and the like were removed by water extractive distillation.

An aqueous crude acetone solution containing 9.2 wt. percent of acetone was introduced into a rectifying column at the rate 20.0 kg./hr. Purified acetone was obtained from the top of the column. In the meantime, in order to remove higher-boiling by-products such as chloropropionaldehydes, chloroacetones and the like which were accumulating in the column, a side stream was withdrawn. The side stream was withdrawn at the rate of 0.24 kg./hr. from the mid part of the column as this was where most of said by-products were likely to accumulate. The withdrawn side stream was mixed with water, stirred, and divided into two phases. The lower phase was discarded. About 80% of the acetone contained in the side stream was extracted into the upper phase which was then circulated to the aforesaid water extractive distillation step. An alkali-containing acetone solution containing 1.0–1.5% moisture and 300 to 500 p.p.m. of sodium carbonate was introduced at the rate of 4 kg./hr. into the rectifying column through an opening located at about one-third depth of the concentration zone of the column and above the bubble cap stage and brought into contact with a countercurrent of ascending acetone vapor for washing. The said acetone suspension was recycled for further utilization.

In Table 4, acetones obtained from the top of the rectifying column by a process in which the amount of water added to the side stream varied such that the former was equivalent to 0.75 times, and 1.5 times the latter are compared as to yield and quality with acetones obtained by the same operation as mentioned above, employing aqueous 40% NaOH solution in place of the said alkali-containing acetone solution.

TABLE 4
Alkali-containing acetone solution

|  | Aqueous 40% NaOH acetone solution | Acetone suspension with 300–500 p.p.m. Na₂CO₃ | Acetone suspension with 300–500 p.p.m. Na₂CO₃ | Acetone suspension with 300–500 p.p.m. Na₂CO₃ |
| --- | --- | --- | --- | --- |
| Side stream, kg./hr | 0.24 | 0.24 | 0.24 | 0.25 |
| Water added, kg./hr | 0.24 | 0.24 | .18 | 0.375 |
| Acetone/water, ratio | 1:1 | 1:1 | 1:0.75 | 1:1.5 |
| Averaged yield of acetone, kg./hr | 1.66 | 1.82 | 1.82 | 1.82 |
| Purification yield, percent | 90.1 | 98.9 | 98.8 | 99.0 |
| Permanganate test time[1], hr | (²) | (²) | (²) | (²) |
| Specific gravity, $d\ 20\ 20$ | 0.791 | 0.791 | 0.791 | 0.791 |
| Moisture content, wt. percent | 0.23 | 0.22 | 0.22 | 0.22 |
| Litmus test | (³) | (³) | (³) | (³) |
| Acidity[4], percent | 0.0009 | 0.0009 | 0.0009 | 0.0009 |
| Vaporization residue, percent | 0.0001 | 0.0002 | 0.0002 | 0.0002 |

[1] ASTM-test D-1363.
[2] More than 5.
[3] Neutral.
[4] Value of acetic acid which was computed on the basis of acid content of acetone.

EXAMPLE 3

A crude acetone was manufactured and rid of lower-boiling-point by-products by the process described in Example 1. The crude acetone was fed at the rate of 200 kg./hr. into a distilling column of 300 mm. inner diameter via the bottom of the column. The column was filled with 1-inch Raschig rings up to 5 m. in height.

An alkali-containing acetone solution containing 7.5 p.p.m. by weight of sodium hydroxide was poured in a divided form into the column via the top thereof at the rate of 200 kg./hr. so as to contact with crude acetone vapor ascending through the column from the bottom thereof. The distillation was carried out at 56° to 57° C. and under normal pressure.

The purified acetone thus obtained from the top of the column indicated the permanganate test time shown in Table 5, below.

TABLE 5.—PERMANGANATE TEST TIME[1], HR.

|  | Crude acetone (feed) | Purified acetone (column top) |
| --- | --- | --- |
| Run: |  |  |
| 1 | 0 | 3 |
| 2 | 1 | (²) |

[1] Based on ASTM-test D-1363.
[2] More than 8.

The same process was followed by employing, in place of the aforementioned acetone solution, an alkali-containing acetone solution containing 10.5 p.p.m. of potassium hydroxide and 1.5 wt. percent of water.

The results are listed in Table 6, below.

TABLE 6.—PERMANGANATE TEST TIME, HR.

|  | Crude acetone (feed) | Purified acetone (column top) |
| --- | --- | --- |
| Run: |  |  |
| 3 | 0 | 6 |
| 4 | 1 | (¹) |

[1] More than 8.

EXAMPLE 4

An aqueous crude acetone solution containing 9.21% of acetone was prepared by the process described in Examples 1, 2 and 3. The crude acetone solution was fed to a rectifying column at the rate of 20.0 kg./hr. and distilled. Higher-boiling-point by-products were removed from the bottom of the column. The side stream was withdrawn at the rate of 0.11 kg./hr. from the mid part of the column in which chloropropionaldehyde, chloroacetone and the like were accumulating. Purified acetone was concurrently distilled off the top of the column. In the meantime, an alkali-containing acetone solution was poured into the column at the rate of 4 kg./hr. in order to wash the ascending acetone vapor. The solution was introduced through an opening located far down from the top of the concentration zone of the column by one-third depth of said zone. Acetone obtained by the above process, excepting that no washing agent was employed, and acetone obtained by use of each of three alkali-containing acetone solutions as washing agent, each differing in alkali content, are compared as to yield and quality in the following Table 8.

TABLE 7

| Product acetone | Washing agent, aqueous 40% NaOH solution | Alkali-containing acetone liquor[1] (a) | (b) | (c) |
| --- | --- | --- | --- | --- |
| Averaged yield of acetone, kg./hr | 1.66 | 1.82 | 1.82 | 1.81 |
| Purification yield, percent | 90.1 | 98.9 | 98.7 | 98.6 |
| Permanganate test time,[2] hr | (³) | (³) | (³) | (³) |
| Specific gravity, $\dfrac{d20}{20}$ | 0.791 | 0.791 | 0.791 | 0.791 |
| Moisture content, wt. percent | 0.23 | 0.22 | 0.27 | 0.27 |
| Litmus test | (⁴) | (⁴) | (⁴) | (⁴) |
| Acidity,[5] percent | 0.0009 | 0.0009 | 0.0009 | 0.0009 |
| Vaporization residue, percent | 0.0001 | 0.0002 | 0.0002 | 0.0002 |

[1] The alkali and water contents of the alkali-containing acetone liquor are as follows:

|  | NaOH, p.p.m. | Na₂CO₃, p.p.m. | H₂O, wt. percent |
| --- | --- | --- | --- |
| (a) | 1 | 1,000 | 1.0–1.5 |
| (b) | 1 | 2,000 | 1.5–2.0 |
| (c) | 1 | 3,000 | 1.5–2.0 |

[2] According to ASTM D-1363.
[3] More than 5.
[4] Neutral.
[5] Value of acetic acid which was computed on the basis of acid content of acetone.

EXAMPLE 5

An aqueous crude acetone solution containing 9.21% of acetone was prepared by the process described in Examples 1 to 4. The crude acetone solution was fed into a rectifying column at the rate of 20.0 kg./hr. for distillation. In order to remove higher-boiling-point by-products such as chloropropionaldehydes, chloroacetones and the like which were accumulating in the column, a side stream was withdrawn at the rate of 0.24 kg./hr. from the mid part of the column where said by-products were accumulating. The withdrawn side stream was mixed with an equivalent quantity of water, stirred and divided into two phases. The lower phase was discarded and acetone contained in the side stream was extracted into the upper phase and recycled to the aforesaid water extractive distillation step. Higher-boiling-point by-products were continuously discharged from the bottom of the column. An alkali-containing acetone solution was introduced at the rate of 4 kg./hr. into a rectifying column through an opening located at about one-third depth of the concentration zone of the column. The alkali-containing acetone solution was contacted with a countercurrent of ascending acetone vapor for washing. The acetone obtained by the same process excepting that aqueous 40% NaOH solution was used in place of said alkali-containing acetone solution and the acetone obtained by employing each of three alkali-containing acetone solutions, each differing in alkali content, are compared as to yield and quality in the preceding Table 7.

TABLE 8

| Product acetone | Washing agent, no washing | Alkali-containing acetone liquor [1] | | |
|---|---|---|---|---|
| | | (a) | (b) | (c) |
| Averaged yield of acetone, kg./hr | 1.82 | 1.81 | 1.81 | 1.81 |
| Purification yield, percent | 98.7 | 98.3 | 98.4 | 97.5 |
| Permanganate test time [2], hr | 0.5–1.0 | ([3]) | 5 | 3 |
| Specific gravity, $d^{20}_{20}$ | 0.791 | 0.791 | 0.791 | 0.791 |
| Moisture content, wt. percent | 0.10 | 0.11 | 0.10 | 0.10 |
| Litmus test | [4] | ([4]) | ([4]) | ([4]) |
| Acidity [5], percent | 0.0005 | 0.0005 | 0.0005 | 0.0005 |
| Vaporization, residue, percent | 0.0002 | 0.0002 | 0.0002 | 0.0002 |

[1] The alkali and water contents of the alkali-containing acetone liquor are as follows:

| | $Na_2CO_3$, p.p.m. | $H_2O$, wt. percent |
|---|---|---|
| (a) | 150 | 0.3 |
| (b) | 25 | 0.2 |
| (c) | 5 | 0.2 |

[2] According to ASTM test D-1363.
[3] More than
[4] Neutral.
[5] Value of acetic acid which was computed on the basis of acid content of acetone.

What we claim is:

1. In the process for the purification of crude acetone manufactured by the oxidation of proplyene in the presence of a catalyst containing a salt of platinum group metals and a halide of heavy metals, which may take at least two valence stages, wherein crude acetone is pretreated to remove therefrom by-products having lower boiling points and then distilled in a rectifying column to recover purified acetone from the top of said column, while by-products having higher boiling points are discarded through the bottom of said column, an improvement which comprises introducing an alkali-containing acetone solution into the upper part of said column, so as to contact said solution with a countercurrent of acetone vapor ascending through said column, said solution containing up to 2.0% water by weight and at least one material selected from the group consisting of alkali metal carbonates and alkali metal hydroxides, the amount of said alkali metal carbonates ranging from 1 to 3000 parts per million parts of said solution and the amount of said alkali metal hydroxides ranging from 1 to 15 parts per million parts of said solution.

2. A process according to claim 1 characterized in that the alkali-containing acetone solution is introduced into a concentration zone of the rectifying column within the upper third of the rectification zone.

3. A process according to claim 1 wherein said solution contains 0.2 to 2.0% water by weight.

4. In the process for the purification of crude acetone manufactured by the oxidation of propylene in the presence of a catalyst containing a salt of platinum group metals and a halide of heavy metals, which may take at least two valence stages, wherein crude acetone as pretreated to remove therefrom by-products having lower boiling points and then distilled in a rectifying column to recover purified acetone from the top of said column, while by-products having higher boiling points are discarded through the bottom of said column, an improvement which comprises introducing into the upper part of said column an alkali-containing acetone solution, said solution containing up to 2.0% water by weight and at least one compound selected from the group consisting of alkali metal carbonates and alkali metal hydroxides, the amount of said alkali metal carbonates ranging from 1 to 3000 parts per million parts of said solution and the amount of said alkali metal hydroxides ranging from 1 to 15 parts per million parts of said solution; subjecting said alkali-containing acetone solution to contact with a countercurrent of acetone vapor ascending through said column while withdrawing a side stream containing halogen-containing products from the mid part of said column; admixing a quantity of water with the withdrawn side stream; dividing the resulting admixture into an aqueous phase and an oily phase; and restoring said aqueous phase to the purification system.

5. A process according to claim 4 wherein said solution contains 0.2 to 2.0% water by weight.

6. A process according to claim 4, characterized in that water is admixed with said side stream in a proportion from 0.25 to 3.0 times the latter by volume and the separation between the aqueous phase and the oily phase is carried out at a temperature from 5° to 60° C.

7. A process according to claim 4, characterized in that the aqueous phase separated from the admixture of water and the side stream withdrawn from the mid part of the rectifying column is brought back to a preceding step for removing by-products having lower boiling points.

8. A process according to claim 4, characterized in that the aqueous phase separated from the admixture of water and the side stream withdrawn from the mid part of the rectifying column is brought back to said rectifying column.

9. A process according to claim 4, characterized in that the alkali-containing acetone solution is introduced into a concentration zone of the rectifying column and at a point within the upper third of the rectification zone.

10. A process for the purification of a crude acetone manufactured by contacting propylene with a catalyst containing palladium chloride and copper chloride which comprises removing by-products having lower boiling points from the crude acetone by means of water extractive distillation and successively feeding the resulting acetone to a rectifying column, withdrawing a side stream containing chlorine-containing by-products from the midpart of said column, discharging by-products having higher boiling points from the said column via the bottom thereof, concurrently introducing an acetone solution containing up to 2.0% water by weight and at least one compound selected from the group consisting of alkali metal carbonates and alkali metal hydroxides, the amount of said alkali metal carbonates ranging from 1 to 3000 parts per million parts of said solution and the amount of said alkali metal hydroxides ranging from 1 to 15 parts per million parts of said solution, said introduction being into a concentration zone of the column within the upper-third of the rectification zone from the top thereof, subjecting said alkali-containing acetone solution to contact with a countercurrent of acetone vapor ascending through said column, collecting said alkali-containing acetone solution on a tray provided in said column, allowing the collected alkali-containing acetone solution to recycle to the part of the column through which said acetone is admitted, and recovering purified acetone from the top of said column.

11. A process according to claim 10 wherein said solution contains 0.2 to 2.0% water by weight.

12. A process for the purification of a crude acetone manufactured by contacting propylene with a catalyst containing palladium chloride and copper chloride, which comprises removing by-products having lower boiling points from the crude acetone by means of water extractive distillation, and successively feeding the resulting acetone to a rectifying column, withdrawing a side stream containing chlorine-containing by-products from the midpart of said column, admixing an amount of water with said side stream in a proportion from 0.75 to 2.0 times the latter by volume at a temperature of 20° to 40° C., dividing the resulting admixture into an aqueous phase and oily phase, bringing said aqueous phase back to the purification system, while discharging by-products having higher boiling points from the bottom of said column, and concurrently introducing alkali-containing acetone solution containing 0.2 to 2.0% water by weight and at least one compound selected from the group consisting of alkali metal carbonates and alkali metal hydroxides, the amount of said alkali metal carbonates ranging from 1 to 3000 parts per million parts of said solution and the amount of said alkali metal hydroxides ranging from 1 to 15 parts per million parts of said solution, said introduction being into a concentration zone of said column within the upper-third of the rectification zone, bringing said alkali-containing acetone solution into contact with a countercurrent of acetone vapor ascending through said column, collecting said alkali-containing acetone solution on a tray in said column, allowing the collected alkali-containing acetone solution to recycle to the part of the column through which the alkali-containing acetone solution is admitted, and recovering purified acetone from the top of said column.

13. A process according to claim 12, characterized in that the aqueous phase which is divided from the resulting admixture is returned to the water extractive distillation column.

14. A process according to claim 12, characterized in that the aqueous phase separated from the admixture of water and side stream withdrawn from the mid part of the rectifying column is brought back to said rectifying column.

References Cited

UNITED STATES PATENTS

| | | | |
|---|---|---|---|
| 2,238,016 | 4/1941 | Downey | 203—44 |
| 2,669,541 | 2/1954 | Catterall | 203—96 |
| 2,906,676 | 9/1959 | Bewley et al. | 203—37 |
| 2,971,894 | 2/1961 | Kendall | 203—33 |
| 3,265,592 | 8/1966 | Van Der Weel | 203—37 |
| 3,330,741 | 7/1967 | Theilig et al. | 203—36 |

WILBUR L. RASCOMB, Jr, Primary Examiner

U.S. Cl. X.R.

203—36, 37, 38, 46, 51, 62, 84, 85, 98, 99; 260—593